Sept. 24, 1968    J. R. WILLSON    3,402,889
FLOW CONTROL SYSTEMS HAVING COMBINED MODULATION
AND PRESSURE REGULATION OF A FLUID FLOW
Filed June 5, 1967    3 Sheets-Sheet 1

INVENTOR.
JAMES R. WILLSON
BY
Christen, Sabol, O'Brien + Caldwell
ATTORNEYS

Sept. 24, 1968

J. R. WILLSON 3,402,889

FLOW CONTROL SYSTEMS HAVING COMBINED MODULATION
AND PRESSURE REGULATION OF A FLUID FLOW

Filed June 5, 1967

INVENTOR.
JAMES R. WILLSON
BY
Christen, Sabol, O'Brien+Caldwell
ATTORNEYS

Sept. 24, 1968  J. R. WILLSON  3,402,889
FLOW CONTROL SYSTEMS HAVING COMBINED MODULATION
AND PRESSURE REGULATION OF A FLUID FLOW
Filed June 5, 1967  3 Sheets-Sheet 3
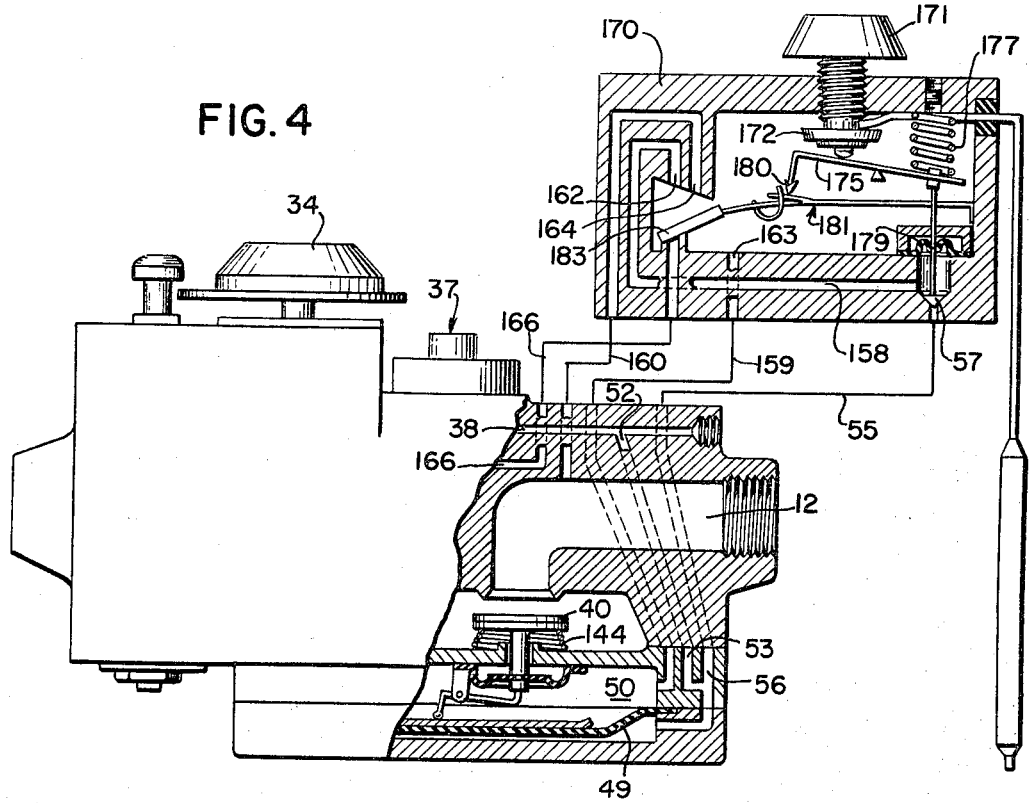
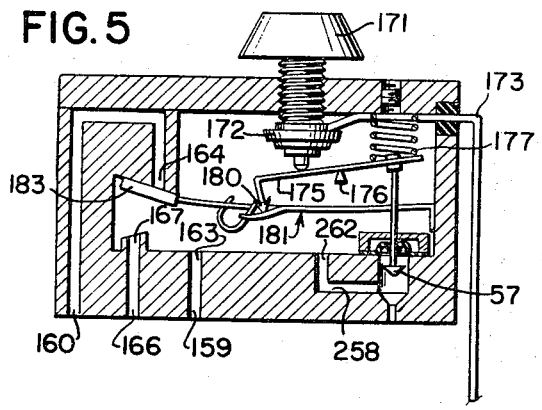
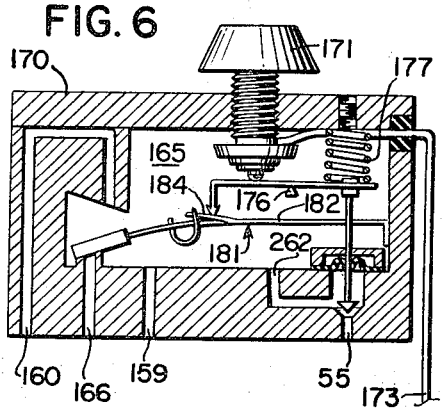
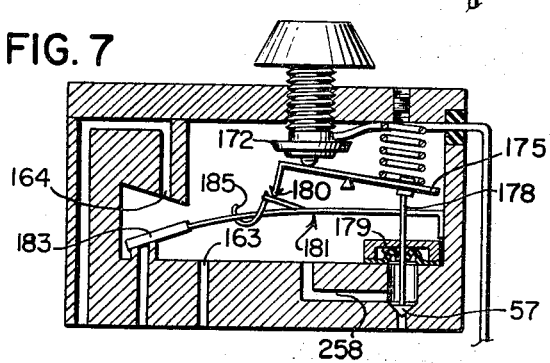
INVENTOR.
JAMES R. WILLSON
BY
Christen, Sabol, O'Brien + Caldwell
ATTORNEYS

United States Patent Office 3,402,889
Patented Sept. 24, 1968

3,402,889
FLOW CONTROL SYSTEMS HAVING COMBINED MODULATION AND PRESSURE REGULATION OF A FLUID FLOW
James R. Willson, Fountain Valley, Calif., assignor to Robertshaw Controls Company, Richmond, Va., a corporation of Delaware
Filed June 5, 1967, Ser. No. 643,698
10 Claims. (Cl. 236—80)

ABSTRACT OF THE DISCLOSURE

A flow control system for main and pilot burner apparatus having a differential pressure operated diaphragm modulating a main valve to regulate the pressure of the main flow between preselected limits and having a pilot regulator controlling the pilot flow, which regulated pilot flow is branched to one side of the main diaphragm and is selectively bled therefrom to vary the differential pressure for operation of the main valve.

Background of the invention (1) *Field of the invention.*—The present invention relates to flow control systems for controlling the flow of fuel to burner apparatus and, in particular, to such a system which regulates the pressure of fuel flows to the main burner and to the pilot burner. The pressure regulation is obtained by a pilot regulator in the pilot flow line and by a diaphragm operated valve in the main flow line with selective controls in an internal bleed system for effecting operation of the diaphragm and modulating the same between preset limits of regulation.

(2) *Description of the prior art.*—The prior art, as exemplified by U.S. Patents No. 3,172,601 and No. 3,235,180, teaches the concept of regulating the pressure of a main flow of fuel by diaphragm means operated from a bleed system which is itself subject to thermostatic control and pressure regulation. While the prior art devices are satisfactory for their particular installations, they do not provide for pressure regulation of the pilot flow of fuel to the pilot burner and they utilize a bleed system separate from the pilot flow to effect main diaphragm operation.

Summary

It is, therefore, an object of the present invention to regulate the pressure of flows in a flow control system with main flow modulation being available at all stages between predetermined limits of main flow regulation.

The present invention has another object in that a pressure regulated pilot flow in a flow control system is selectively controlled to vary a pressure regulated main flow.

Another object of this invention is to provide a pressure regulated and modulated flow control system with on-off control by differential pressures on the main regulating diaphragm.

A further object of this invention is to provide a pressure regulated and modulated flow control system with on-off control by balancing pressures on the main diaphragm.

In accordance with the present invention, the flow control system includes a casing having inlet means adapted for connection to a fuel source, main outlet means adapted for connection to a main burner and pilot outlet means adapted for connection to a pilot burner, a pilot flow passage extending between the inlet means and the pilot outlet means, pilot regulating means operatively disposed in the pilot flow passage for pressure regulation therein, main valve means for controlling a main flow of fuel to the main burner, pressure operated diaphragm means operatively connected to the main valve means for pressure regulation of the main flow, a pair of pressure chambers with the diaphragm means therebetween, branch passage means establishing communication between the main outlet means and one of the pressure chambers, conduit means having one end communicating with the pilot flow passage downstream of the pilot regulating means and having another end communicating with another one of the pressure chambers, bleed passage means having one end communicating with the conduit means and another end communicating with the branch passage means, and bleed valve means operatively disposed in the bleed passage means to control a bleed flow therethrough whereby pressure in the pressure chambers is varied to effect movement of the diaphragm means and the main valve means.

Brief description of the drawings

FIG. 2 is a diagrammatic cross section of a modification of a control device for a burner control system;

FIG. 3 is a partial cross section similar to FIG. 2 showing the control elements in a different controlling position;

FIG. 4 is a partial cross section similar to FIGS. 2 and 3 showing the control elements in still another controlling position;

FIG. 5 is a cross section of a modified detail of FIG. 2;

FIG. 6 is a cross section similar to FIG. 5 showing the modified detail in the same controlling position as FIG. 3; and FIG. 7 is a cross section similar to FIGS. 5 and 6 showing the modified detail in the same controlling position as FIG. 4.

Description of the preferred embodiments

Figure 1:
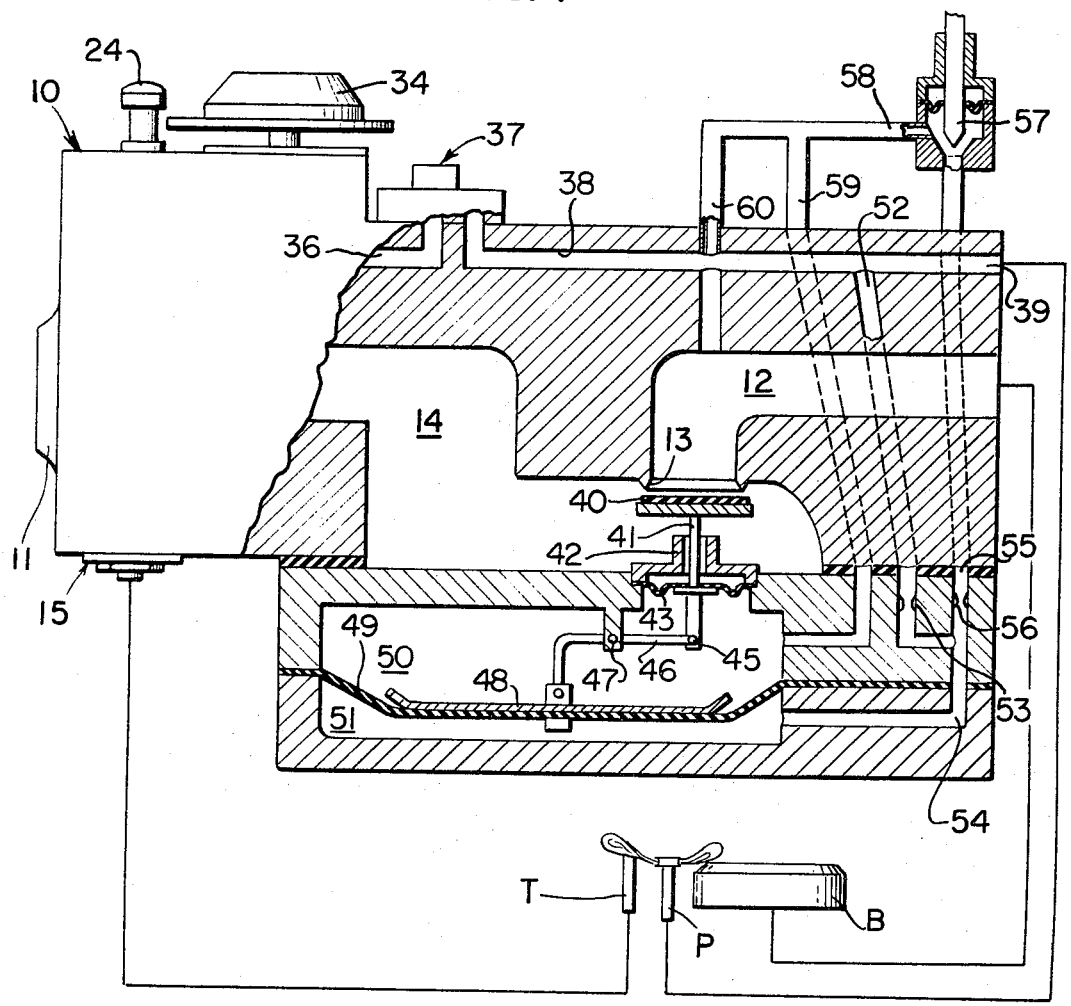
FIG. 1 is a schematic diagram of a burner control system embodying the present invention.

The present invention is embodied in a burner control system shown in FIG. 1 to include a main burner B, a pilot burner P and a thermocouple T disposed in the flame of the pilot burner P which is located in igniting proximity to the main burner B. A combination control device, indicated generally at 10, has an inlet 11 connected to a source of fuel, such as a gas main (not shown), an outlet 12 connected by suitable piping to the main burner B, and a valve seat 13 between the outlet 12 and an inlet chamber 14 which receives a main flow of fuel from the inlet 11. As is illustrated in FIG. 2, adjacent the inlet 11, the main flow is controlled by a resettable automatic safety device, indicated generally at 15, which is conventional practice in the art.

The automatic safety device 15 includes a safety valve member 16 (FIG. 2) biased by a coil spring 17 towards a valve seat 18; the valve member 16 is held away from the seat 18 by an electromagnetic mechanism which is electrically connected to the thermocouple T (FIG. 1). The voltage generated by the thermocouple T is not sufficient to attract the armature to the magnet core of the electromagnetic mechanism but is sufficient to hold such armature in its attracted position. Accordingly, reset means to move the armature to its attracted position include a plunger 19 having one end extending through the valve seat 18 (FIG. 2) and its opposite end slidably extending through a wall of casing 10 that is sealed by an O-ring 20. A coil spring 21 surrounds a portion of the plunger 19 and is mounted in compression between a washer 22 freely mounted thereon and an annular collar 23 fixed to the plunger 19 for movement therewith. A push button 24 is fixed on the protruding end of plunger 19 and extends through a guide collar 25 into engagement with plunger collar 23.

The valve seat 18 establishes communication between the inlet 11 and a hollow portion 26 of the casing 10, which is intersected by a conical bore 27 having a truncated end communicating with the inlet chamber 11. A manually operable plug valve 28 similarly shaped as a truncated core, is rotatably seated in the conical bore 27. The plug valve 28 has a central axial bore 29, one end of which opens into the inlet chamber 14 and the other end of which opens into a radial port 30 for registry with the hollow portion 26. Circumferentially spaced from the radial port 30, the plug valve 28 has a second smaller port 31 radially extending from the bore 29 to establish a pilot flow of fuel. A coil spring 32 surrounds a stem on the large end of the plug valve 28 and is mounted in compression between such large end and a cover plate 33 secured to the top of casing 10 by any suitable fastening means (not shown). A dial knob 34 is keyed to the protruding end of the plug valve stem for manually rotating the plug valve 28 between "off," "pilot" and "on" positions. The dial knob 34 has a peripheral flange 35 which extends under the reset button 24; a notched portion in the flange 35 aligns with the reset button 24 only when the knob 34 is in the "pilot" position whereby the reset button may only be depressed when the plug valve 28 is in the "pilot" position.

Downstream of the plug valve 28, the pilot flow passage 36 is controlled by a pressure regulator 37 of conventional structure as shown in FIG. 2, which regulates the pressure of the pilot flow of fuel to the pilot outlet passage 38 leading to the pilot outlet 39 that is connected by suitable piping to the pilot burner P.

The main flow of fuel from the inlet chamber 14 is controlled by a main valve member 40 movable relative to the main valve seat 13 by a valve stem 41 which extends through a guide collar 42 and which is secured intermediate its ends to a sealing and balancing diaphragm 43. The diaphragm 43 provides a balancing force to counterbalance the pressure differential across the valve seat 13 whereby the regulation characteristics are greatly improved, particularly at low flows. A pivot pin 45 connects the lower end of stem 41 to the end of an L-shaped crank arm 45 having its longer leg pivotally mounted intermediate its ends to a pivot pin 47 that is carried by an adjacent wall of the casing 10. The shorter leg of crank arm 46 is pivotally connected to the center of a back up plate 48 which is centrally fixed to a flexible diaphragm 49, made of rubber or the like. The periphery of diaphragm 49 is sealingly mounted between adjacent sections of the casing 10 while its central portion separates the hollow portions of such sections into upper and lower pressure chambers 50 and 51, respectively. With the above arrangement, the valve member 40 is provided with a modulated movement to regulate the pressure of the fluid flow past the valve seat 13 in accordance with differential pressure variations as sensed by the pressure chambers 50 and 51.

The casing 10 is provided with internal porting communicating with the pressure chambers 50 and 51 to provide the operating pressures therefor. Accordingly, a conduit 52 has one end communicating with an intermediate portion of the pilot outlet passage 38 and has a flow restricting orifice 53 adjacent its other end which communicates with the common junction of a pair of bleed passages 54 and 55. The bleed passage 54 communicates with the pressure chamber 51; the second bleed passage 55 has a flow restricting orifice 56 larger than orifice 53, downstream of which it is controlled by an adjustable flow control valve 57 that may be manually operated or may be automatically operated by any suitable temperature sensing means responsive to the area being heated by the main burner B to vary the bleed flow in accordance with temperature variations. A bleed passage 58 on the downstream side of valve 57 leads to two branch passages 59 and 60; branch passage 59 communicates with the pressure chamber 50 and branch passage 60 communicates with the outlet 12.

In the following description of the sequence of operation of FIG. 1, it will be assumed that the pilot flow passage 36 is in communication with the inlet 11 either directly or under the control of the safety device 15 and/or the manual plug valve 28; accordingly, a pilot flow of fuel from the passage 36 is subject to pressure regulation by the pilot regulator 37 so that a regulated pilot flow proceeds through the pilot outlet passage 38, the pilot outlet 39 and the piping to the pilot burner P which maintains a flame for igniting the main burner B during its cycling in response to thermostatic control. The regulated pilot flow in the pilot outlet passage 38 also proceeds through the conduit 52 and restrictor 53 to the common junction with the two bleed passages 54 and 55; when the bleed control valve 57 is closed, the regulated pilot flow proceeds only through the bleed passage 54 to the pressure chamber 51 and when the bleed control valve 57 is open, the chamber 51 is partially depressurized and the regulated pilot flow proceeds through the bleed passage 55 and its restrictor 56, the open valve 57, the bleed passage 58 and the branch passage 59 to the pressure chamber 50.

When bleed control valve 57 is closed, the regulated pilot flow is routed to the pressure chamber 51 as described above, and the regulated main flow is routed to the pressure chamber 50 through a path traced from the inlet chamber 14 through the opened valve seat 13, the branch passage 60 and the bleed passage 58 and the branch passage 59 to the pressure chamber 50. The pressure drops and regulator settings of the control device 10 are selectively designed so that the pressure in the pressure chamber 51 exceeds the pressure in the opposite pressure chamber 50 under conditions of normal flow and inlet pressure. Thus, the main valve member 40, which by design has a predetermined open position to deliver a pressure regulated main flow of fuel to the main outlet 12, is subject to modulation by variations from the designed pressure differential between the pressure chambers 50 and 51. For example, inlet pressure changes in the inlet chamber 14 as by surges from the pressure source and/or outlet pressure changes in the main outlet 12 as by scale clogging the ports of main burner B, results in an unbalanced condition acting to move main diaphragm 49 whereby the main valve member 40 is subject to an opening or closing movement to bring the outlet pressure at the main outlet 12 back to the designed pressure setting for the main flow of fuel to the main burner B.

When the bleed valve 57 is wide open, the pressure in the pressure chamber 51 is reduced and the various components are disposed in their respective control positions that are illustrated in FIG. 1. Thus, the pressure in chamber 51 is controlled at a lower regulated pressure dependent on the ratio of the orifice sizes of the restrictors 53 and 56. The restrictor 56 is sized to maintain the pressure differential between the pressure chambers 50 and 51; the restrictor 53 is smaller than restrictor 56 to the degree required to obtain a desired minimum of the modulating regulated pressure range. In FIG. 1, the restrictors 53 and 56 are illustrated as fixed flow restrictors whereby a desired percentage of the minimum modulation control point is obtained; however, the restrictors 53 and 56 may be variable to allow for variation in the minimum modulation control point.

As the bleed control valve 57 is progressively moved toward its closed position, either manually or by the temperature responsive means, the main flow of fuel to the main outlet 12 is progressively increased from the minimum flow condition (FIG. 1) to a maximum flow condition. The increased flow condition is caused by the progressive closing of the bleed control valve 57 which causes a progressive increase of pressure in the pressure chamber 51 (until it reaches the same pressure as that at the pilot outlet 39) thereby progressively opening the main valve member 40 to the maximum of the regulated modulation range.

From the foregoing, it is apparent that at both extremes of the modulation range and at intermediate positions therebetween, the modulated flow through the main outlet 12 is at all times regulated and controlled so as to compensate for variations in pressure from the desired pressure setting, such as changes in the available inlet pressure. The above arrangement has the particular advantage of regulating the pressure of the pilot flow of fuel to the pilot burner and utilizing a bleed of such regulated pilot flow to control the differential pressure for operating the main flow valve which provides pressure regulation of the main flow of fuel to the main burner. By subjecting the bleed line for the regulated pilot flow to particular control means, the present invention obtains fluid flow modulation between preselected or preset limits (by manual means or condition responsive means) with such modulation being under pressure regulating control at all stages of modulation.

In FIG. 1, the bleed valve 57 may be operated automatically, as by a thermally responsive sensor, to vary the bleed flow to bleed passage 58 whereby the main flow of fuel past the valve seat 13 is modulated in accordance with predetermined temperature variations. Thus, the main flow is subject to modulation and pressure regulation and in some installations it may be desired to provide the main valve 40 with an on-off operation. Accordingly, the modification of FIGS. 2, 3 and 4 includes the additional arrangement to provide such an on-off function to the main valve 40.

In the following description of FIGS. 2–4, the identical reference numerals are utilized for identical parts already described in connection with FIG. 1, so that only the different structure will be described with new reference numerals in the 100 series. For example, bleed passage 158, branch passage 159 and branch passage 160 have ports 162, 163 and 164, respectively, which open into a common chamber 165. Additional porting in the form of an inlet pressure passage 166 has one end communicating with the inlet chamber 14 and an opposite end terminating in a port 167 opening into the common chamber 165.

The common chamber 165 is enclosed in a hollow housing 170 which is schematically illustrated in FIGS. 2–4 as being separated from the main casing of the control device, however, it is to be understood that the housing 170 may be secured to the top of the main casing or may be integrally formed therewith. A temperature setting dial 171 is adjustably threaded into the housing 170 and on its inner end carries a bellows or power element 172. A capillary tube 173 has one end communicating with the interior of the power element 172 and an opposite end communicating with a thermal sensing bulb 174 that is disposed in the space being heated by the main burner B. The power element 172, capillary tube 173 and thermal sensing bulb 174 constitute thermally responsive means which is a closed system filled with an expansible fluid so that a variation in temperature sensed by the thermal sensing bulb 174 produces a corresponding expansion or contraction of the power element 172.

The power element 172 engages one end portion of a lever 175 which is intermediately fulcrumed at 176 and has its opposite end portion biased by a coil spring 177. A valve stem 178 is fixed to lever 175 underneath the coil spring 177 and extends through a diaphragm seal 179 so that the bleed valve 57 is fixed to the free end of such stem 178. An operating element 180 extends from the other end of lever 175 for effecting operation of a snap mechanism 181 which may be of any suitable construction, such as is shown in U.S. Patent No. 2,237,705 issued Apr. 8, 1941, to E. F. Kohl. The snap mechanism 181 includes a generally rectangular resilient blade member 182 with a valve plate 183 on its free end for movement between the port 167 and the oppositely disposed ports 162 and 164. In plan view (not shown) the blade member 182 has a rectangular cutout with an integral operating tongue 184 extending into such cutout; a generally C-shaped spring 185 is mounted between one edge of such cutout and the edge of the tongue 184. As is well known in the art, the tongue 184 causes the C spring 185 to move through a dead center position whereby the valve plate 183 is transferred with a snap action from one position to another.

FIG. 2 illustrates the relative positions of the control elements in the off condition of the main control elements when the main burner B is in an off condition and the pilot burner P is in an igniting condition. In describing a sequence of operation for the modification of FIGS. 2–4, it will be assumed that the temperature setting dial has been rotated to a desired temperature of 70° F. and the power element 172 is expanded by the fluid therein since the sensor bulb 174 indicates the 70° F. requirement is satisfied; thus lever 175 has been depressed counterclockwise (as viewed in FIG. 2) about the fulcrum 176 so that the bleed valve 57 is fully opened and the ports 162 and 164 are closed by the snap valve plate 183. Under these conditions there is no flow into the common chamber 165 from the bleed passage 158 even though the bleed valve 57 is wide open; thus, the pressure chamber 51 is pressurized by the regulated pilot flow from the pilot outlet passage 38. In addition, since the port 167 is open, an inlet pressure flow is traced from the passage 166 through the port 167, the common chamber 165 and the branch passage 159 to the pressure chamber 50. Accordingly, a pressure differential between the higher inlet pressure in chamber 50 and the lower regulated pilot pressure in chamber 51 acts to assist the valve closure spring 144 in securing valve closure and in maintaining the valve 40 closed during the off condition.

As the temperature sensed by the bulb 174 decreases below the 70° F. setting, the power element 172 contracts and the lever 175 moves clockwise about the fulcrum 176. Such lever movement gradually moves the bleed valve 57 to an intermediate position as shown in FIG. 3 and causes the snap mechanism 181 to snap the plate valve 183 from the ports 162 and 164 to the port 167 which is thus closed. FIG. 3 illustrates the relative positions of the control elements wherein the main valve 40 is partially opened to define an on-step position whereby the main flow of fuel is initially at a minimum to permit soft ignition at the main burner B. This soft ignition feature results from pressure reductions in the chambers 50 and 51 caused by the closing of the inlet pressure passage port 167 and the action of the restrictors 53 and 56.

When the valve plate 183 is snapped to close the port 167, the pressure chamber 50 is in communication with the main outlet 12 by a path traced from the pressure chamber 50 through the branch passage 159, port 163, chamber 165, port 164, and branch passage 160 to the main outlet 12; thus chamber 50 is vented to the main outlet 12 so that the chamber 51 now becomes the one of higher pressure causing the diaphragm 49 to open slightly the main valve 40. During this operation, the restrictor 53 reduces the pressure of the regulated pilot flow in the bleed passage 54 and the pressure chamber 51, which pressure is still greater than that in the bleed passage 55 because of the restrictor 56 and because the bleed valve 57 permits communication between the bleed passage 55 and the chamber 165 which is at main outlet pressure.

As the temperature responsive means continues the clockwise movement of lever 175, the relative positions of the control elements are shown in FIG. 4, i.e., the bleed valve 57 is closed so that the pressure chamber 51 is increased to that of the regulated pilot flow in passage 38. This causes the diaphragm 49 to open the main valve 40 to its predesigned regulating position. The chamber 50 is still in communication with the main outlet 12 so that the pressure therein increases to that of the regulated pressure at the main outlet 12. The system in FIG. 4 will now operate in the same manner as that of FIG. 1 by supplying a regulated pilot flow to the pilot burner P, a regulated main flow to the main burner B, and by modulating the regulated main flow in accordance with temperature variations. For example, temperature variations sensed by the bulb 174 effects a modulation of the bleed valve 57 without any snap movement of the valve plate 183. As the temperature in the space heated by the main burner B increases, the power element 172 expands to move the lever 175 counterclockwise whereupon the bleed valve 57 is first opened before snap action of the snap mechanism 181; thus, the main valve 40 is provided with an off-step movement wherein the control elements are returned to their relative positions illustrated in FIG. 3. Subsequently, the plate valve 183 is snapped to its position shown in FIG. 2 and the main valve 40 is closed.

In the event the flame at the pilot burner P should be extinguished from any cause, the electromagnetic device 15 would be deenergized and the safety valve 16 (FIG. 2) would be closed on the valve seat 18 to effect 100% shut-off of all fuel flow. To relight the pilot burner P, the plug valve dial 34 must first be rotated to its "pilot" position whereby the reset button 24 may be depressed to establish a flow of fuel to the pilot burner P which is ignited as by a match; as soon as the thermocouple T is heated and the electromagnetic device 15 energized, the reset button 24 may be released and the dial 34 rotated to its "on" position.

In the following description of the modification of FIGS. 5, 6 and 7, identical reference numerals are utilized for identical parts already described in connection with FIGS. 1–4, so that only the different structure will be described with new reference numerals in the 200 series. In FIGS. 2–4, the bleed passage 158 had a port 162 opening into chamber 165 which port was controlled by the valve plate 183 and the only structural difference appearing in the modification of FIGS. 5–7 is that bleed passage 258 has a port 262 opening directly into the chamber 165 whereas in FIGS. 2–4 the bleed passage port 162 was controlled by the snap valve 183. In FIGS. 5–7, only the control housing 170 is shown and it is understood that such housing is a part of the main control device casing as in FIGS. 2–4.

The general operation of the modification in FIGS. 5–7 is similar to that of FIGS. 2–4 so only the different portions will be described. In the "off" condition of the main valve 40, the control elements in housing 70 are disposed as illustrated in FIG. 5 which corresponds to FIG. 2. Since the bleed passage port 262 is always open to chamber 165, the pressure chambers 50 and 51 are each exposed to main inlet pressure; with balanced pressures acting on the diaphragm 49, the main valve is closed by the coil spring 144. FIG. 6 illustrates the control elements' positions for the on-step (and off-step) condition of the main valve 40 for soft ignition purposes and the various pressures are the same as described in FIG. 3 wherein the bleed passage port 162 is not sealed by the snap valve 183. FIG. 7 illustrates the control elements' positions for the full "on" condition of the main valve 40 and the various pressures are the same as described in FIG. 4 since bleed passage ports 162 and 262, in each modification, are in communication with their respective chambers 165.

Inasmuch as the present invention is subject to many other modifications, variations and changes in detail, it is intended that all matter contained in the foregoing description or shown on the accompanying drawing shall be interpreted as illustrative and not in a limiting sense.

What is claimed is:

1. In a flow control system for main and pilot burner apparatus, the combination comprising
a casing having inlet means adapted for connection to a fuel source, main outlet means adapted for connection to the main burner and pilot outlet means adapted for connection to the pilot burner,
a pilot flow passage extending between said inlet means and said pilot outlet means,
pilot regulating means operatively disposed in said pilot flow passage for pressure regulation of a pilot flow of fuel to the pilot burner,
main valve means operatively disposed between said inlet means and said main outlet means for controlling a main flow of fuel to the main burner,
pressure operated diaphragm means operatively connected to said main valve means to move the same for pressure regulation of the main flow,
means defining a pair of pressure chambers in said casing,
said diaphragm means defining a movable wall between said pair of pressure chambers,
branch passage means establishing communication between said main outlet means and one of said pressure chambers,
conduit means having one end communicating with said pilot flow passage downstream of said pilot regulating means and another end communicating with another one of said pressure chambers,
bleed passage means having one end communicating with said conduit means and another end communicating with said branch passage means, and
bleed valve means operatively disposed in said bleed passage means to control a bleed flow therethrough whereby pressures in said pressure chambers are varied to effect movement of said diaphragm means and said main valve means.

2. The invention as recited in claim 1 wherein said bleed valve means is movable between on and off positions to define minimum and maximum limits of pressure regulation for the main flow.

3. The invention as recited in claim 1 wherein first and second flow restriction means are respectively disposed in said conduit means and in said bleed passage means upstream of said bleed valve means.

4. The invention as recited in claim 3 wherein said first flow restrictor means has a smaller size than said second flow restrictor means whereby pressure in the said another one of said pressure chambers is dependent upon a ratio of the sizes of said first and second flow restrictor means.

5. The invention as recited in claim 1 wherein said branch passage means includes a valve chamber separating said branch passage means into first and second branch passages having ports opening into said valve chamber, an inlet pressure passage extending from said inlet means and terminating in a port opening into said valve chamber, the said another end of said bleed passage means terminating in a port opening into said valve chamber, and valve plate means in said valve chamber controlling said inlet pressure passage port and having first and second control positions controlling communication between said valve chamber and said pressure chambers whereby said diaphragm means effects movement of said main valve means between on and off positions.

6. The invention as recited in claim 5 wherein said valve chamber is defined by a housing, temperature responsive means carried by said housing, lever means mounted in said valve chamber, snap acting means operatively connected between said lever means and said valve plate means for moving the same between its control positions, and means defining an operative connection between said lever means and said bleed valve means for moving the same in accordance with the temperature responsive means.

7. The invention as recited in claim 6 wherein said temperature responsive means includes adjustable temperature setting means to establish a set point for movement of said valve plate means between its control positions.

8. The invention as recited in claim 6 wherein said lever means moves said bleed valve means independently of said valve plate means when in its first control position whereby pressures in said pressure chambers are varied to provide a stepped movement to said main valve means.

9. The invention as recited in claim 6 wherein said valve plate means in its first control position closes said inlet passage port and in its second control position closes said first branch passage port and said bleed passage means port.

10. The invention as recited in claim 6 wherein said valve plate means in its first control position closes said inlet passage port and said first branch passage port.

References Cited

UNITED STATES PATENTS

| | | | |
|---|---|---|---|
| 2,685,412 | 8/1954 | Schell | 236—80 X |
| 2,876,951 | 3/1959 | Matthews | 236—80 X |
| 3,300,174 | 1/1967 | Urban | 236—80 X |
| 3,360,198 | 12/1967 | Katchka | 236—80 |

WILLIAM J. WYE, *Primary Examiner.*